(12) United States Patent
Ono et al.

(10) Patent No.: US 6,183,081 B1
(45) Date of Patent: *Feb. 6, 2001

(54) KIT PROVIDING INDEPENDENT RIGHT AND LEFT EYEGLASS LENSES WITH SIDE FRAMES AND METHOD FOR ASSEMBLY THEREOF

(75) Inventors: Kotaro Ono; Kazunori Kagei, both of Fukui; Kenji Sumida, Tochigi, all of (JP)

(73) Assignee: Washi Kosan Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/667,772

(22) Filed: Jun. 21, 1996

(30) Foreign Application Priority Data

Jun. 29, 1995 (JP) .................................... 7-163357

(51) Int. Cl.⁷ ...................................................... G02C 5/02
(52) U.S. Cl. ........................... 351/124; 351/128; 351/204
(58) Field of Search .................................. 351/204, 124, 351/126, 128, 130, 131, 133, 110, 140

(56) References Cited

U.S. PATENT DOCUMENTS

| 2,117,139 | * | 5/1938 | Bouchard | 551/124 |
| 4,448,501 | * | 5/1984 | Cogez | 381/128 |
| 4,762,407 | * | 8/1988 | Anger et al. | 351/204 |
| 5,459,534 | * | 10/1995 | Morrison | 351/124 |
| 5,477,281 | * | 12/1995 | Boyer | 351/124 |

FOREIGN PATENT DOCUMENTS

| 19311 | * | 5/1915 | (GB) | 351/128 |
| 2166887 | * | 5/1986 | (GB) | 351/128 |

* cited by examiner

*Primary Examiner*—Huy Mai
(74) *Attorney, Agent, or Firm*—Jordan and Hamburg LLP (57) ABSTRACT

Lenses are provided in an assortment of frequently used prescriptions and are preground to a desired final contour. The lenses are optionally provided with a lug, temple and modern and with a split bridge member attached thereto to provided a half eyeglass assembly. Alternately, the parts may be provided unassembled. Proper lenses are selected on the basis of a prescription by a consumer and are assembled by the consumer to form a completed pair of eyeglasses. A bridge assembled from the split bridge members is adjustable to set a desired interpupillary distance. The positions of holes for attaching the bridge and lug to the lenses are line-symmetrical with respect to a vertical axis of each lens so as to allow the lens to be used as either a right or left lens.

9 Claims, 8 Drawing Sheets

KIT PROVIDING INDEPENDENT RIGHT AND LEFT EYEGLASS LENSES WITH SIDE FRAMES AND METHOD FOR ASSEMBLY THEREOF

BACKGROUND OF THE INVENTION

A first form of the present invention relates to a framed lens making it possible to improve the sales mode of glasses. In the distribution stage, components of glasses are supplied in easy-to-assemble form or in partly assembled form to individuals to allow the latter to assemble the components into a final product.

A second form of the invention relates to interchangeable lens used for simple farsighted glasses and it also relates to a pair of glasses using the same.

Eyeglass construction changes with time, making great progress in shape, material or ornamental aspects. Basically, however, a pair of lenses are fitted in rims and connected by a bridge to form a front portion, and a lug, hinge, temple, modern, and pads are integrated to provide a final product. Further, in recent years, rimless glasses have been in fashion. On the other hand, since the advent of plastic lenses, greater importance has been put on fashionability, with people using colored lenses or glasses serving both as eyesight correcting glasses and as sunglasses. As a result, the number of people who readily use glasses is increasing and it has become no longer uncommon that a person possesses two or three pairs of glasses.

However, the so-called frame which fixes the lenses in position is not so inexpensive and right and left lenses for a pair of glasses often differ in, for example, eyesight correcting index from each other and must have their outer peripheries ground to fit them to the rim shape. In rimless glasses, drilling for fixing frame parts is required and in making glasses, it is inevitable to depend on the processor, resulting in an expensive product. Further, eyesight decreases year by year, so that each time one's eyesight becomes less than satisfactory, one has to buy a new pair of glasses.

On the other hand, with the progress of resin lenses, it has become possible to supply a lens which is high in quality, resistant to shock, light in weight, and inexpensive. In recent years, a handy camera is in wide use, using the catch phrase "Utsurun-desu" (Takes Good Pictures). This commodity is characterized in that the indispensable components of a camera, i.e. a lens, shutter, film and dark box are integrally supplied, shattering the concept that film and a camera are to be separately sold, it being understood that there may have been conceived a new idea of selling a lens-equipped film.

In the field of glasses, unlike the lens-equipped film, it is impossible to perform mass production using a single design chart. The reason is that the requirements imposed on eyeglass producers differ from user to user as to eyesight correcting lens index, astigmatism, longsightedness, shortsightedness and interpupillary distance; thus, to accommodate such varying conditions, the number of types to be prepared would be enormous.

In buying a pair of glasses, usually, the user goes to an eye doctor to get a prescription therefor. He then gives a retailer (optical shop) an order for a pair of glasses on the prescription. If the proper lenses are not in stock, they have to be procured through the distribution stage including the successive steps of the processor (laboratory), wholesaler (trading company), and lens maker. After he has obtained the desired lenses, he has to ask the processor to grind the outer edges of the lenses to fit them to the rim shape of his favorite frame. Due to passage through such stages, it takes a substantial period of time before the glasses are delivered, requiring much expense. To shorten this period, a variety of types of lenses have to be kept in stock in the distribution stage, and some of the parts in stock deteriorate with the lapse of time, and the reduced commodity value makes them unsalable. At any rate, when a glasses user buys a pair of glasses, various processing steps are required, making it impossible to obtain it readily or inexpensively.

Further, glasses have right and left lenses in a pair, but usually, the right and left lenses differ in prescription, a factor which prolongs the time of delivery. Therefore, to shorten, if any, the time of delivery, there are found many patent applications relating to removable frames convenient for changing lenses, and among these applications there is one proposing a pair of disposable glasses, as disclosed in Japanese Utility Model Kokai Sho 63-80526. Further, it has become common practice for optical shops to grind lenses to fit them to rims.

The first form of this invention is based on the principle that, in order to provide a glasses lens which is light in weight, resistant to shock and inexpensive, a glasses frame (hereinafter referred to as frame) and lenses are integrated.

The problem to be solved is to provide members for glasses which make it possible for a glasses user to select proper lenses for his eye prescription and a necessary minimum number of members required for mounting the lenses, so that he is allowed to complete a pair of glasses by himself.

As for glasses using eyesight correcting lenses, first, the user selects his favorite glasses frame and the processor grinds the peripheries of the lenses matching the user's right and left eye prescriptions and then fits the lenses in the frame and the optical distributor presents the product as a pair of glasses. This is a common method. Usually, the lens producer produces circular lenses of about 70 mm in diameter and supplies them to the distributor. In the distributor's shop, the lens contour is ground according to the shape of the frame selected by the user.

The lens producer in the aforesaid sales mode is obliged to present lenses including the material to be later removed by grinding, and the cost of said surplus material is, after all, borne by the user. When the user desires a pair of fashionable glasses, he can afford to bear such cost, but in the case of glasses which are practical and which should not be so inconvenient to the user, e.g., a pair of farsighted glasses, it is desired that the glasses be as inexpensive as possible.

Figure 11:
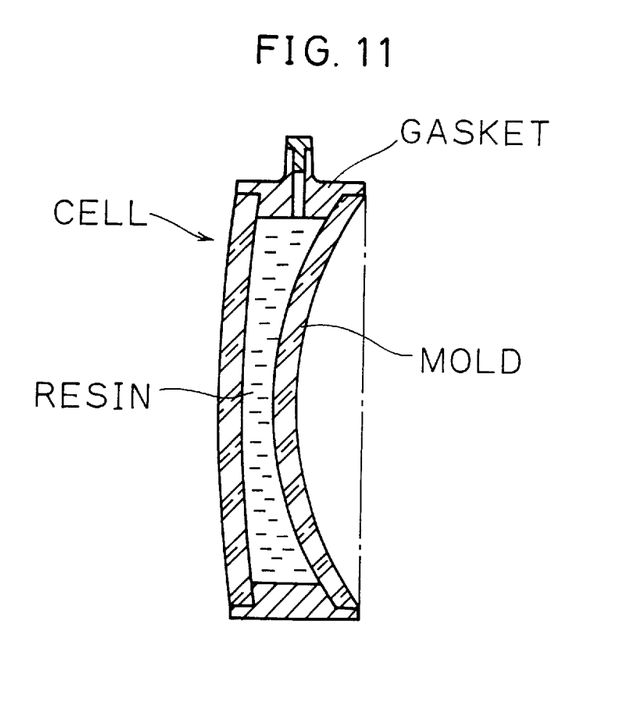
FIG. 11 is a side view, in section, showing how a plastic lens is produced.

As considered from the lens producer's circumstances, it is desired that lenses be produced in a practical shape with the intention of excluding the wasteful material as much as possible. On the other hand, in the case of a plastic lens produced by cast-molding, molds and gaskets for producing lenses of practical shape have to be prepared. Particularly, molds are expensive. And such molds have to coincide with the contour of a lens and two molds are required to constitute a cell (shown in FIG. 11), and if the contour is changed, the same molds cannot be used. This problem is also the case with gaskets, and the same molds for an injection molding machine for producing gaskets cannot be used in such case.

For the above reason, it might be thought to be most convenient if lenses could be made by injection molding. However, since there are two lens contour shapes for the right and left eyes, two types of molds are required. Even in the case of a lens whose eyesight correcting index alone is considered to be most important, such as farsighted glasses, there are as many as five index values 1.0, 1.5, 2.0, 2.5, and 3.0, and to prepare lenses of these index values, ten types of molds are necessary. Molds for lenses must have their surfaces accurately ground and are inevitably expensive, adding to the cost of lenses.

The problem to be solved in the second form of the invention is to provide a glasses lens and glasses using the same, which make it possible to simplify the lens making process, and decrease the number of types of molds and the amount of stock.

SUMMARY OF THE INVENTION

According to the first form of the invention, lenses having an eyesight correcting index in great demand are suitably selected on a prescription and have their lateral surfaces ground to a normal size, and a temple, lug, bridge and pad are attached to a lens, while allowing a glasses user to freely select right and left framed lenses and assemble them into a final product. Framed lens split bodies for the right or left eye which are split at or around a connecting member, such as a bridge, are individually supplied as single commodity units, so that in the subsequent distribution stage or by the user himself, mutually opposite units are combined to form a pair of glasses.

In order to facilitate assembly and to freely combine lenses to form a pair, a lug, temple and modern, which are part of a frame, are attached to a lens in advance.

Further, in order to facilitate assembly and to decrease the number of types of parts so as to reduce the cost thereof, a construction is employed in which the lug, temple and modern are integrated by a flexible member in lieu of a hinge.

A connecting member, such as a bridge, a pad and a pad foot are attached to a lens for one side.

In consideration of the fact that glasses users differ in physique from each other, the length of the bridge is made variable to allow the user to select the proper interpupillary distance.

In the case of an astigmatism correcting lens, it is presented such that the lateral surfaces of the lens are ground and then an astigmatic axis indicating mark is formed on the particular portion of the lens, said mark being erasable when used.

As for the lens body, a plastic lens which is fracture resistant and light in weight is selected; acrylic resin, polycarbonate, and CR-39 may be properly used.

Particularly, a lens which is scratch resistant without having a hard coat is employed.

The shapes and/or colors of the respective lenses and/or frames of the framed lens split bodies for the right and left eyes which are split at or around the connecting member, such as a bridge, are made different.

Since the combination of the eyesight correcting lens index, right-hand eye use, left-hand eye use, and color for individual commodities presented is determined by the user, the maker who supplies same has to perform rigorous stock control, and the specification of each commodity is recorded on a bar code indicator, thus, commodities are sold with such indicators stuck thereto or printed thereon; thus, the details of the commodities sold can be easily controlled.

As a pair of glasses, the relative position of the lug, bridge, and lens is substantially constant, and a pattern paper is provided to help the user assemble the parts. The user determines the position. Further, on the pattern paper there is written the horizontal axis as an optical axis, a vertical axis, and an inclination axis index of astigmatism.

According to a second form of the invention, the positions of holes for attaching a bridge and a lug in frameless glasses are disposed symmetrical with respect to the vertical axis of the lens and provided with the same attaching construction or the attaching constructions for the right and left lenses in partly framed glasses are made interchangeable for the right and left sides, thereby making it possible to produce right and left interchangeable lenses by injection molding so as to simplify the manufacturing process and decrease the types of molds.

Further, by using a lens whose bridge and lug hole positions are symmetrical with respect to the vertical axis of the lens and provided with the same attaching construction, assembly and disassembly operations are facilitated, a fact which is suitable for frameless glasses.

On the other hand, in the case of partly framed glasses, if the right and left lenses are designed so that they are of the same attaching construction and are interchangeable, then lenses can be freely selected and interchangeable; thus, when the right and left lenses are the same in eyesight correcting index, they can be interchanged to provide a pair of glasses different in external appearance. Even if they are different in eyesight correcting lens index, the same effect can be obtained by selecting a lens of different shape having the same eyesight correcting index.

DETAILED DESCRIPTION OF THE INVENTION

Figure 1:
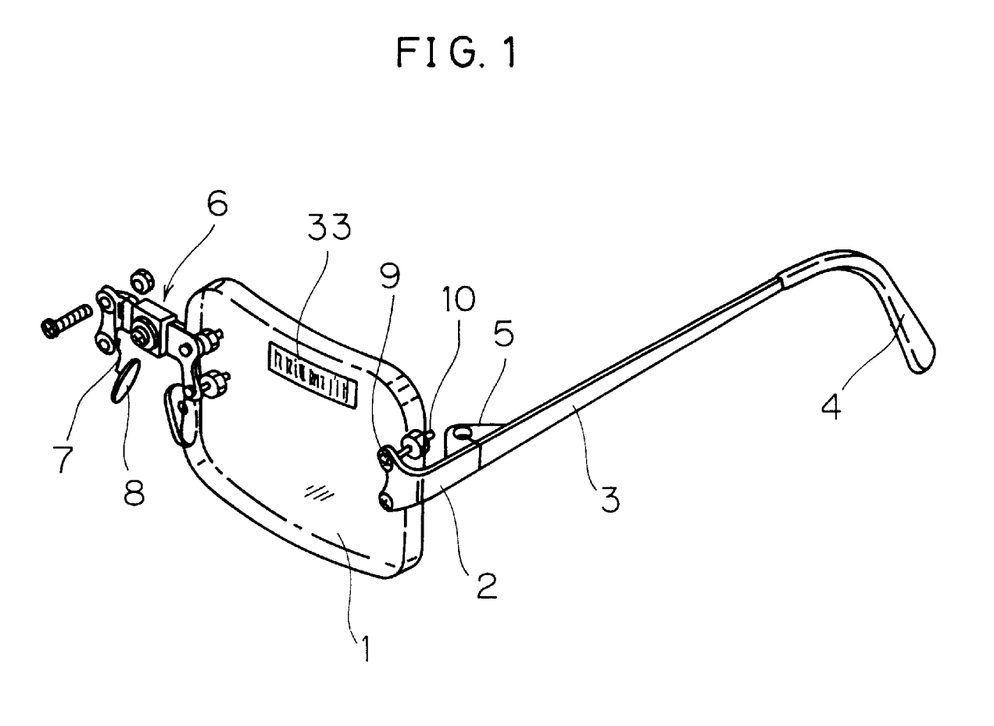
FIG. 1 is a perspective view of an embodiment of a framed lens according to a first form of the present invention.

FIG. 1 is a perspective view of an embodiment of a framed lens according to the invention. The numeral 1 denotes a lens; 2 denotes a lug; 3 denotes a temple, 4 denotes a modern; 5 denotes a hinge; 6 denotes a bridge; 7 denotes a pad foot; and 8 denotes a pad. The fixing of the lens 1 and lug 2, and the bridge 6 and lens 1 is effected by a plurality of screws 9 and nuts 10; thus, attachment and detachment are possible.

A user who wants to buy a pair of glasses selects lenses for the right and left eyes according to the sphericality (SPH), astigmatism index (CYL), astigmatic axis index (AXIS) and interpupillary distance (P. D) shown on his prescription. In this embodiment, a description will be given of a person who has no astigmatism. With no astigmatism index, the only concern is the sphericality so that the maker presents glasses halves for the respective sphericalities as shown in FIG. 1. Since the bridge 6, pad foot 7 and the pad 8 are integrated together, it is not always necessary to fix them to the lens 1 in advance, and the user has his choice.

FIG. 1 shows the assembly for the left eye, and the assembly for the right eye (not shown) likewise comprises a lens, a lug, a temple, a modern and a hinge, which are integrated together. This lens for the right eye also is selected according to the prescription. After the pair of right and left members have been selected, the user uses screws and nuts to fix the members for the right eye to the bridge 6. Another method for fixing the lens and lug or bridge is to use an adhesive agent or support them by an elastic body; at any rate a reliable inexpensive method should be used.

Figure 2:
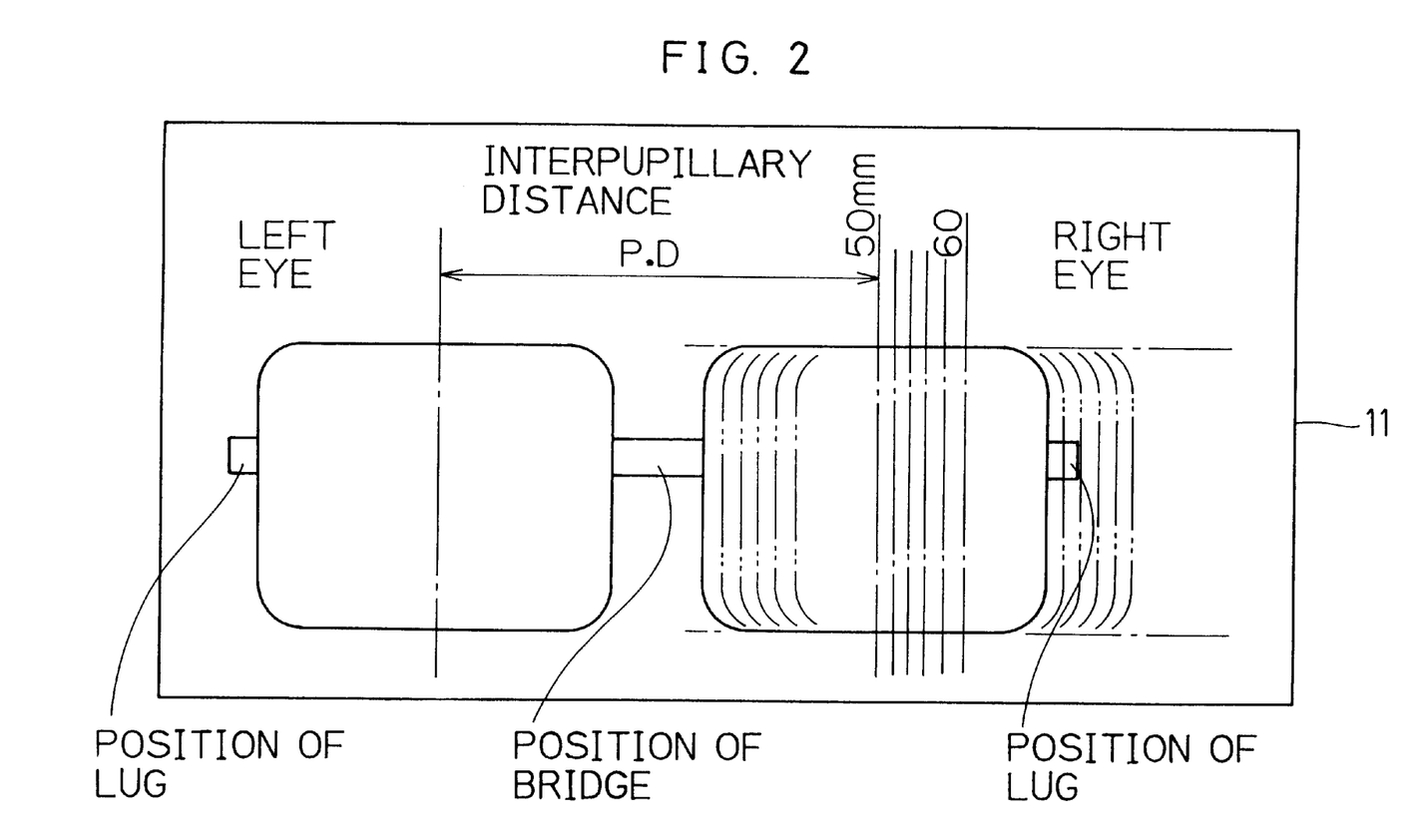
FIG. 2 is a plan view of a pattern paper for setting interpupillary distance.
Figure 3:
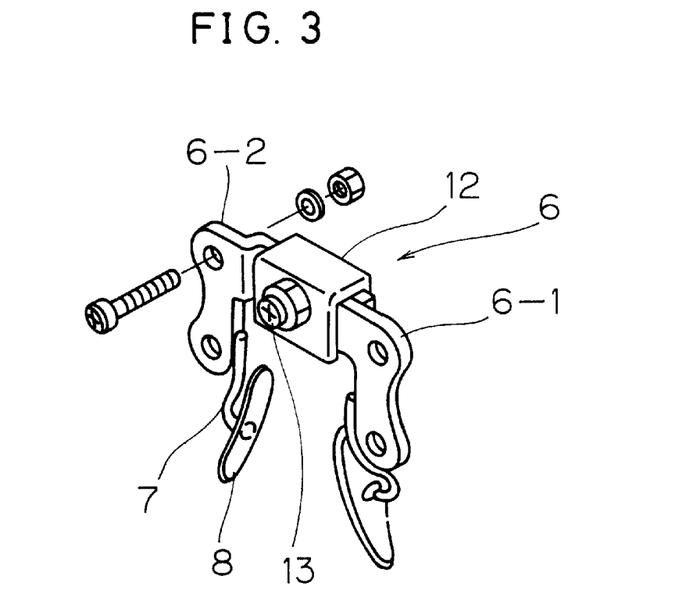
FIG. 3 is an enlarged assembled perspective view of a bridge in FIG. 1.

As for the setting of the interpupillary distance, assembled glasses are put on a real size pattern paper 11 shown in FIG. 2 with the outer shape of the lens in place, whereby the accurate interpupillary distance is set. An enlarged perspective view of the bridge 6 for explaining this operation is shown in FIG. 3. Lens fixing blocks 6-1 and 6-2 are slidable relative to each other in a frame 12. A set screw 13 is provided for preventing this slide movement. First, the set screw is loosened to place the right and left lenses the user's interpupillary distance apart and, with this state maintained, the set screw 13 is tightened. Thus, the glasses are completed. As for the position of the pad 8, the pad leg 7 is suitably bent as by a pair of pliers to allow the pad to snugly engage the nose.

In FIG. 1, the numeral 33 denotes a bar code indicator, and the contents indicated thereby are that the commodity is for the left eye, that the lug, temple, modern and hinge are attached, while indicating the eyesight correcting lens index and color, and that it is a commodity having the bridge attached thereto. When the commodity is sold, if these items of data are read by a bar code reader and stored, this makes it easier for the provider to serve customers. In this embodiment, the bar code indicator is stuck to the surface of the lens, but it may be provided in any area where sticking or printing is possible, such as the frame 3 or modern 4. Further, the commodity for the opposite side or the right eye has a bar code indicator stuck thereto or printed thereon.

Figure 4:
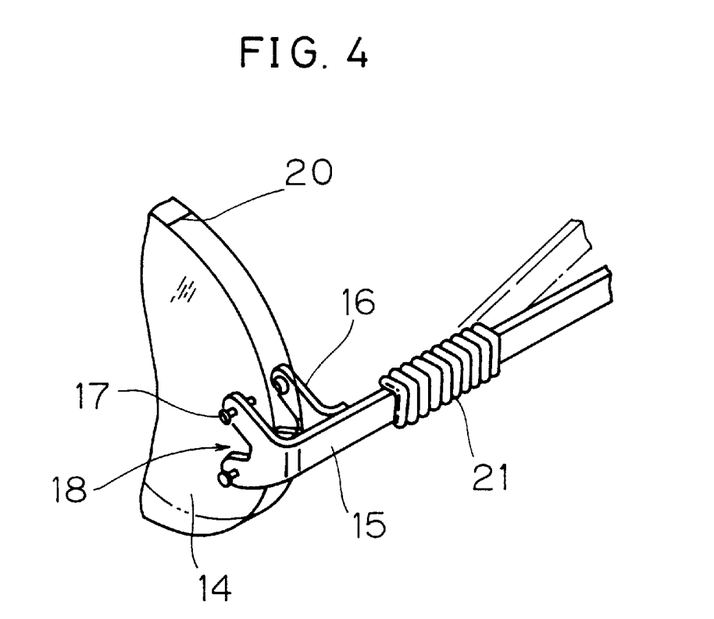
FIG. 4 is a perspective view of a framed lens, showing a method of nipping a lens.

When a user who has an astigmatism selects lenses, it is necessary to determine the sphericality (SPH), astigmatic axis index (AXIS) and interpupillary distance (P. D) according to the prescription. First, the required lenses for the right and left eyes are taken out of the storage shelving. In this case, since the astigmatic axis index differs from user to user, round lenses are preferable. As for the method of holding the lens, it is preferable to use means shown in FIG. 4 for nipping the lens 14. It comprises a fixing element 16 for holding a substantially 90-degrees bent lug 15 and a lens, and screws 17. The front ends of the screws 17 are pointed, and when the lens 14 is clamped, the lug 15 is bent in a direction to increase its angle, so that a reacting force permanently acts on the lens and hence it will never be loosened. In FIG. 4, two screws are used, and a notch 18 is provided to allow them to act individually. Such method of fixing the lens is also employed in the bridge. Further, the hinge is replaced by a flexible member, such as a spring 21, to simplify the construction and reduce the cost. The lug 15, temple and spring 21 may be integrally molded.

Figure 5:
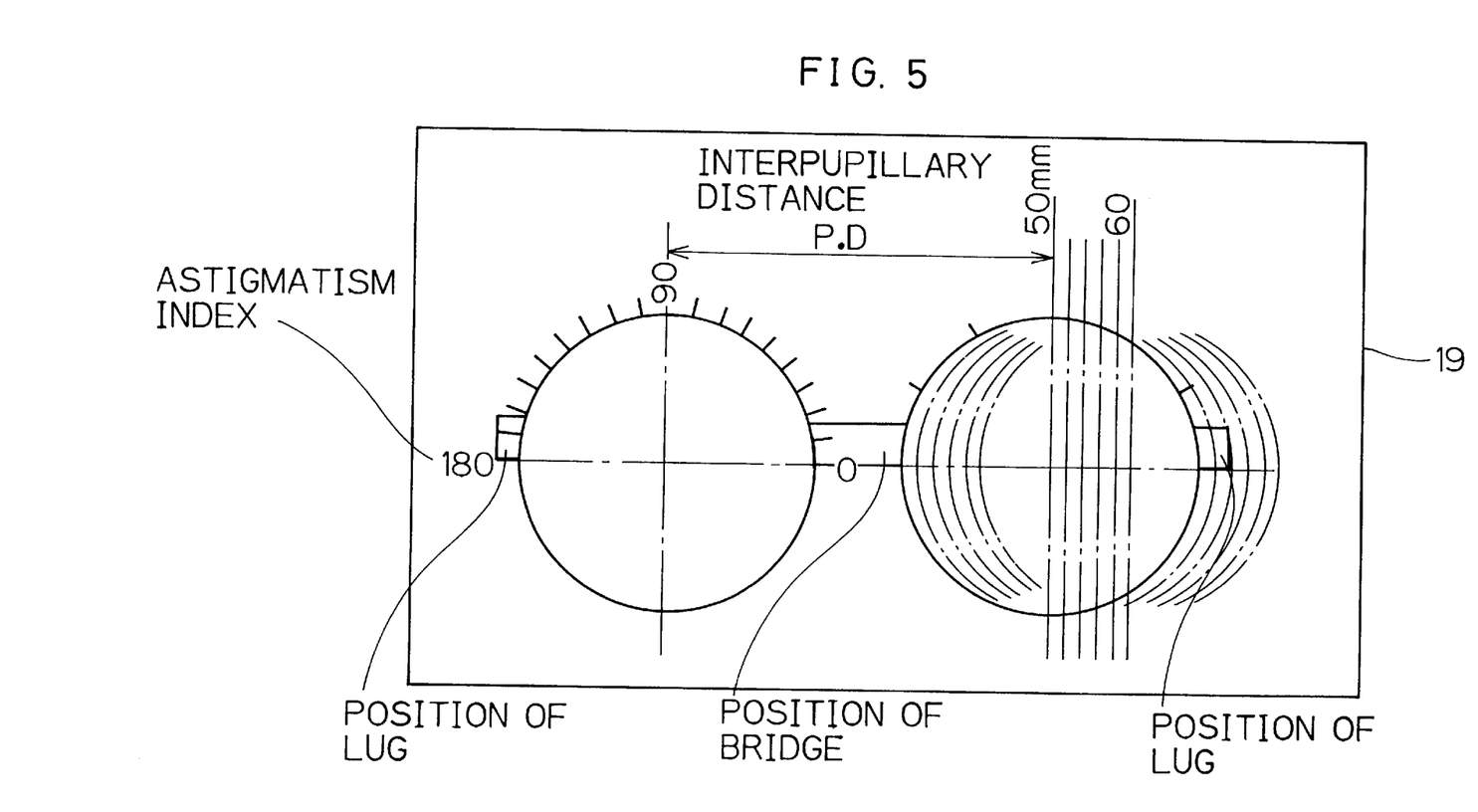
FIG. 5 is a plan view of a glasses assembling pattern paper for lenses with astigmatism index.

How to determine the astigmatism index according to the prescription will now be described. The lens is placed on a pattern paper 19 shown in FIG. 5. A mark 20 indicating the astigmatic axis indicated on the peripheral edge of the lens 14 is placed at the astigmatism index position on the pattern paper 19. With this position maintained, the bridge and lug are fixed at places indicated on the pattern paper, whereby the glasses are completed.

Figure 6:
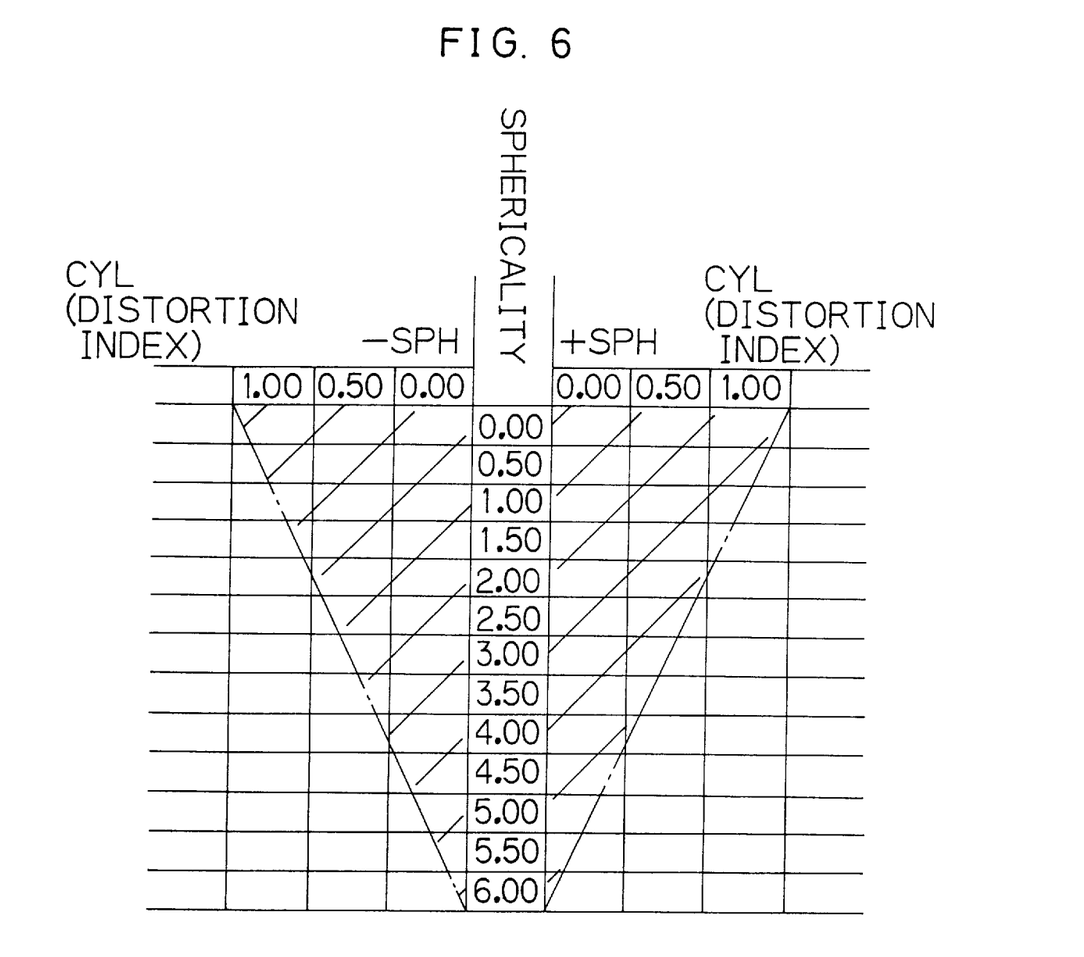
FIG. 6 is a graph showing lens consumption and lens index.

Means which allows the user to select suitable lenses without using a prescription are now described. The relation between lenses and the demand of lenses is empirically found as shown in FIG. 6, it being seen that for CR-39, the greatest demand tends to lie in the shaded area. Therefore, it is recommendable to display lenses having greater demand on the lens storage shelving in the shop.

Figure 7:
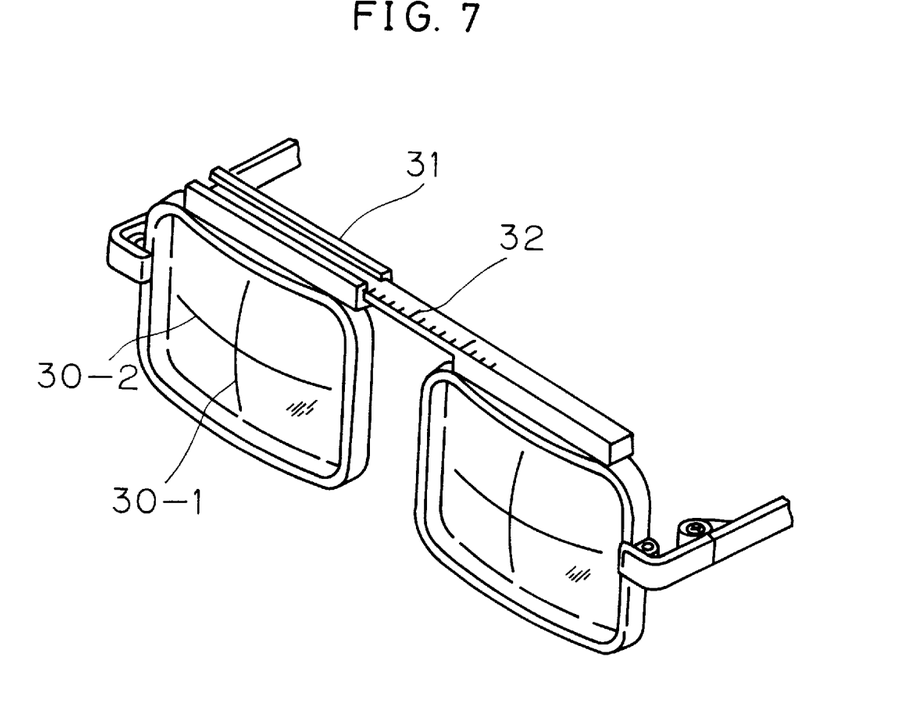
FIG. 7 is a perspective view of a pair of eyesight testing glasses.

Ready-made glasses, such as shown in FIG. 7, are prepared which have lenses, right and left, with a sphericality index of 0.5–6.0 and a distortion index of 0, fitted in the frame in which the lenses are slidable right and left and cursor lines 30 are drawn along the horizontal and vertical axes extending through the center of each lens. The user tries putting on such glasses on the basis of a vision of 1.2 with respect to an auxiliary eyesight test chart or eyesight tester installed in the shop, so as to select proper lenses which give him good eyesight.

The vision of 1.2 is a value which causes no inconvenience in the daily life and it is mentioned herein as an example, not in a limiting sense. After the user has selected proper lenses giving him good eyesight, he puts on the glasses and looks at himself in the mirror and moves the glasses right and left so as to position each intersection of the cursor lines 30 at the center of the pupil. The slide 31 installed in the eyebrow portion of the glasses has graduations 32 in mm attached thereto, making it possible to find the interpupillary distance. With the above procedures, the required glasses are obtained in the same manner as in Embodiment 1.

According to Embodiments 1 and 2, which make it possible to separately buy the right and left lenses for a pair of glasses, it is possible to construct a pair of glasses which creates a new fashion. That is, it is possible to enjoy a combination in which the right and left lenses differ in external appearance or in shape or color. As for parts which differ in color, there are lenses and frames.

In Embodiments 1 and 2, frameless lenses are described. However, the commodity may be furnished in the form of a combination of individual rimmed lenses and a frame.

Figure 8:
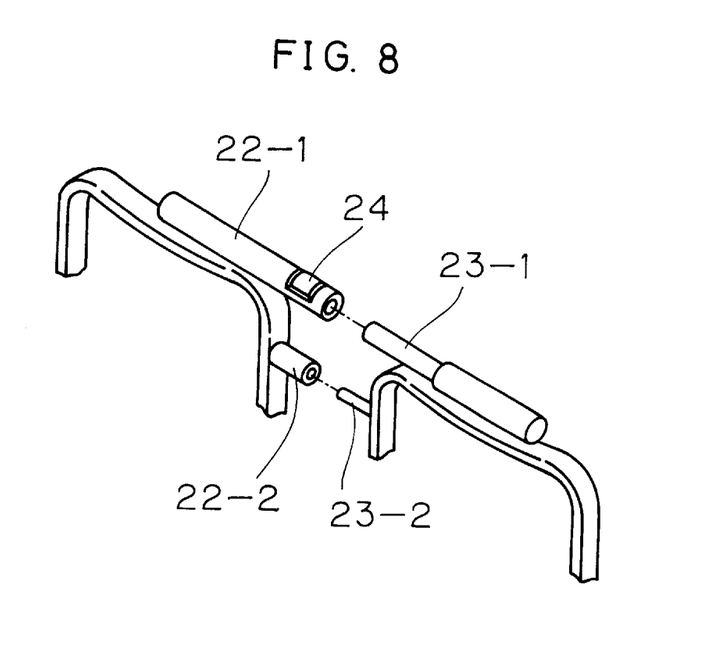
FIG. 8 is a perspective view showing how the right and left rims are connected.

As shown in FIG. 8, tubes 22-1 and 22-2 are provided on the eyebrow portion and bridge, respectively, and round bars 23-1 and 23-2 adapted to fit in them are provided. The user freely selects right- and left-hand side lenses and a frame. He obtains a completed article of glasses by fitting the tubes and round bars together. The tube 22-1 is cut away at a portion to receive a spring 24 adapted to press the round bar 23-1, the arrangement being such that the slidable tube and round bar are semipermanently fixed together at a suitable position.

Figure 9:
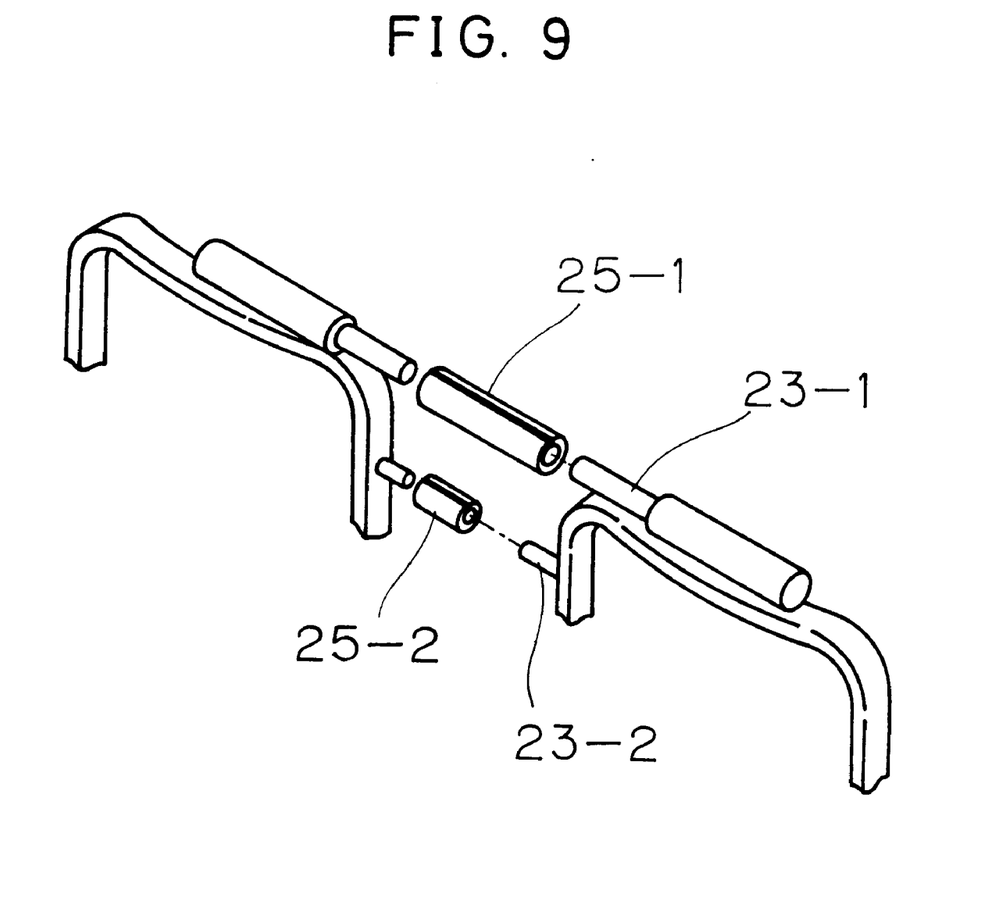
FIG. 9 is a perspective view showing how the right and left rims are connected.

Further, the tubes 25-1 and 25-2 in the eyebrow portion and the bridge can be made independent, as shown in FIG. 9. In this case, if tubes of different lengths are prepared in advance, the range in which the interpupillary distance can be adjusted is made larger. If the tubes are of the split pin type to grip the round bars 23-1 and 23-2, then semipermanent fixing can be attained at any position.

The members which connect the eyebrow portion and the bridge are shown as tubes and round bars; however, their cross section may be polygonal or U-shaped so long as they have the function of fitting together.

In the present invention, the commodity is presented in the form having connected thereto at least one of the members constituting a pair of glasses; however, it goes without saying that the invention may be embodied by individually presenting the components.

Figure 10:
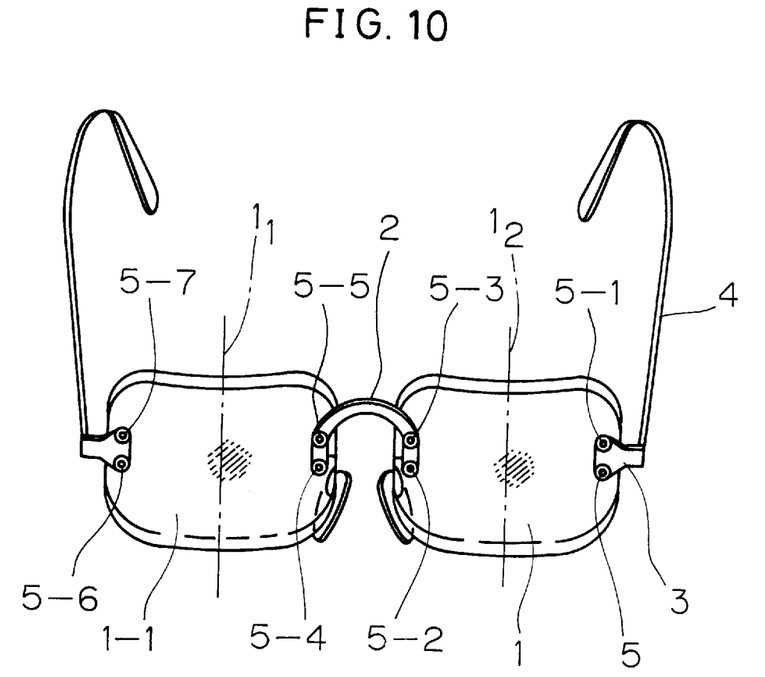
FIG. 10 is a front view showing an embodiment of a pair of glasses according to a second form of the present invention.

FIG. 10 is a front view showing an embodiment of a pair of glasses according to a second form of the invention. The numeral 1 denotes a lens; 2 denotes a bridge; 3 denotes a lug; and 4 denotes a temple. This figure shows a pair of frameless glasses, using plastic lenses. The numeral 5 denotes a set screw, such set screws 5-1 to 5-7 being the same. Further, the distance between the set screws is the same with the set screws 5 and 5-1, the set screws 5-2 and 5-3, the set screws 5-4 and 5-5, and the set screws 5-6 and 5-7, and the vertical attaching positions of the set screws with respect to the lens are also the same. Thus, the attaching hole positions of the bridge and lug are symmetrical with respect to the vertical optical axes $l_1$, $l_2$ of the lenses and the set screw hole diameters are also the same. In the case of the embodiment, the respective contours of the lenses 1 and 1-1 are the same and holes through which the set screws 5 extend are formed in the plastic lenses. If, therefore, all set screws are removed, the glasses are disassembled, and the left and right lenses 1 and 1-1 may be interchangeably used. Therefore, even if the user's right and left eyes differ in eyesight correcting lens index, lenses having proper eyesight correcting lens indexes can be selected to complete a pair of glasses. Further, the lens shapes need not be congruous with each other, and lenses of different shapes may be interchangeably used for both eyes or they may be inverted and set in place, so as to form a pair of fashion glasses.

As a result, the lens producer has only to prepare a single type of mold having the shape of user's lenses having respective eyesight correcting lens indexes, without having to differentiate between molds for the right and left eyes; the lenses thus produced can be used for both the right and left eyes, so that inventory is naturally reduced to half. In addition, if lenses having the shapes which users use are injection molded, they can be readily put to use by simply deburring their outer edges; thus, the grinding step can be omitted.

In partly framed glasses, the frame has only to be of a shape having an attaching construction common with interchangeable type of lenses for the right and left eyes. If the user uses a frame with which lenses can be easily mounted and dismounted, then he can achieve his object by having his eyes tested for eyesight correcting lens index, and then buying lenses having the thus found indexes. This procedure omits the intermediate processing steps in the manufacture of conventional glasses, so that the commodity distribution cost can be further reduced.

In the first form of the invention, the user is allowed to obtain a pair of glasses, not in a completed form, but in the pre-stage of production, by freely selecting lens configurations and assembling the parts in his desired form; thus, it is unnecessary for the glasses to pass through the conventional circulation and processing stages. Therefore, in presenting glasses, the date for delivery and cost is reduced to a necessary minimum, a result which is very useful both for the maker and for the consumer.

Glasses according to the second form of the invention make it possible to halve the number of types of the lens injection molds and omit the distribution stage and with such glasses, since limited inventory and a reduced number of lens types suffice, the production cost is drastically reduced.

Further, the user can enjoy pairs of glasses of different images by interchanging the right and left lenses or by selecting different lens shapes with the same eyesight correcting lens indexes.

What is claimed is:

1. An eyeglass apparatus assembleable with another one of said eyeglass apparatus, the eyeglass apparatus comprising:

a spectacle lens for one of a right and left eye of a user;

said spectacle lens having attached thereto a side assembly including a lug, a temple and a modern, wherein the lug, the temple and the modern are integrally molded with a flexible member between said lug and said temple; and said spectacle lens having a half bridge connecting member engageable with another half bridge connecting member of said another one of said eyeglass apparatus, wherein said eyeglass apparatus is prepared as a single commodity unit and is assembleable together by engaging said half bridge connecting member with said another half bridge connecting member of said another one of said eyeglass apparatus corresponding to another one of said right and left eye to form a bridge and thereby a complete pair of glasses.

2. The eyeglass apparatus as set forth in claim 1, wherein said half bridge connecting member has a pad foot and a pad.

3. The eyeglass apparatus as set forth in claim 2, wherein said half bridge connecting member includes a means for forming a bridge which is variable in length when connected to said another half bridge connecting member.

4. The eyeglass apparatus as set forth in claim 1, wherein an edge surface of the spectacle lens has an astigmatic axis mark which is erasable.

5. A kit for constructing a pair of glasses comprising:

first and second lenses each having a common shape symmetrical about a center vertical optical axis thereof;

left and right frame members each configured to accept either one of said first and second lenses by virtue of said common shape being symmetrical;

said left and right frame members having left and right lugs attached thereto respectively;

said left and right frame members having left and right bridge portions respectively; and means for adjustably connecting said left and right bridge portions to set an interpupillary distance between said first and second lenses.

6. A kit for permitting consumer assembly of eyeglasses, comprising:

at least two spectacle lenses;

an adjustable bridge member having pads and pad feet and means for connecting together two spectacle lenses selected from said at least two spectacle lenses by said consumer, said at least two spectacle lenses being configured to be connected by said adjustable bridge member and said adjustable bridge member including adjustment means for adjusting an interpupillary distance of said two spectacle lenses;

left and right lug and temple assemblies having means for connecting to said spectacle lenses, said spectacle lenses being configured for connection with said left and right temple assemblies; and an adjustment template with gradations corresponding to a plurality of interpupillary distances for setting said interpupillary distance to a predetermined distance by adjusting said adjustable bridge member when said two spectacle lenses with said adjustable bridge member connected therebetween are laid on said adjustment template with vertical optical axes thereof appropriately aligned with said gradation of said adjustment template.

7. The kit of claim 6 wherein:

said adjustable bridge and said left and right lug and temple assemblies have means for attaching to said two spectacle lenses;

said at least two spectacle lenses include holes for attaching said adjustable bridge and any one of the right and left lug and temple assemblies that are symmetrically disposed with respect to vertical optical axes of said at least two spectacle lenses to correspond with said means for attaching of said adjustable bridge and said right and left lug and temple assemblies; and said at least two spectacle lenses being symmetrical about said vertical optical axes such that each of said at least two spectacle lenses is assembleable in any one of a left and a right lens position.

8. The kit of claim of claim 6 wherein said at least two spectacle lenses is a plurality of lens provided in a plurality of different prescriptions.

9. The kit of claim 8, wherein said plurality of lenses is provided in a first group having said left lug and temple assemblies pre-attached thereto and a second group having said right lug and temple assemblies attached thereto.

* * * * *